Oct. 8, 1968 W. E. HIRTENSTEINER 3,404,989
METHOD OF FREEZING FOODS WITH LIQUID NITROGEN
Filed March 9, 1964 2 Sheets-Sheet 1
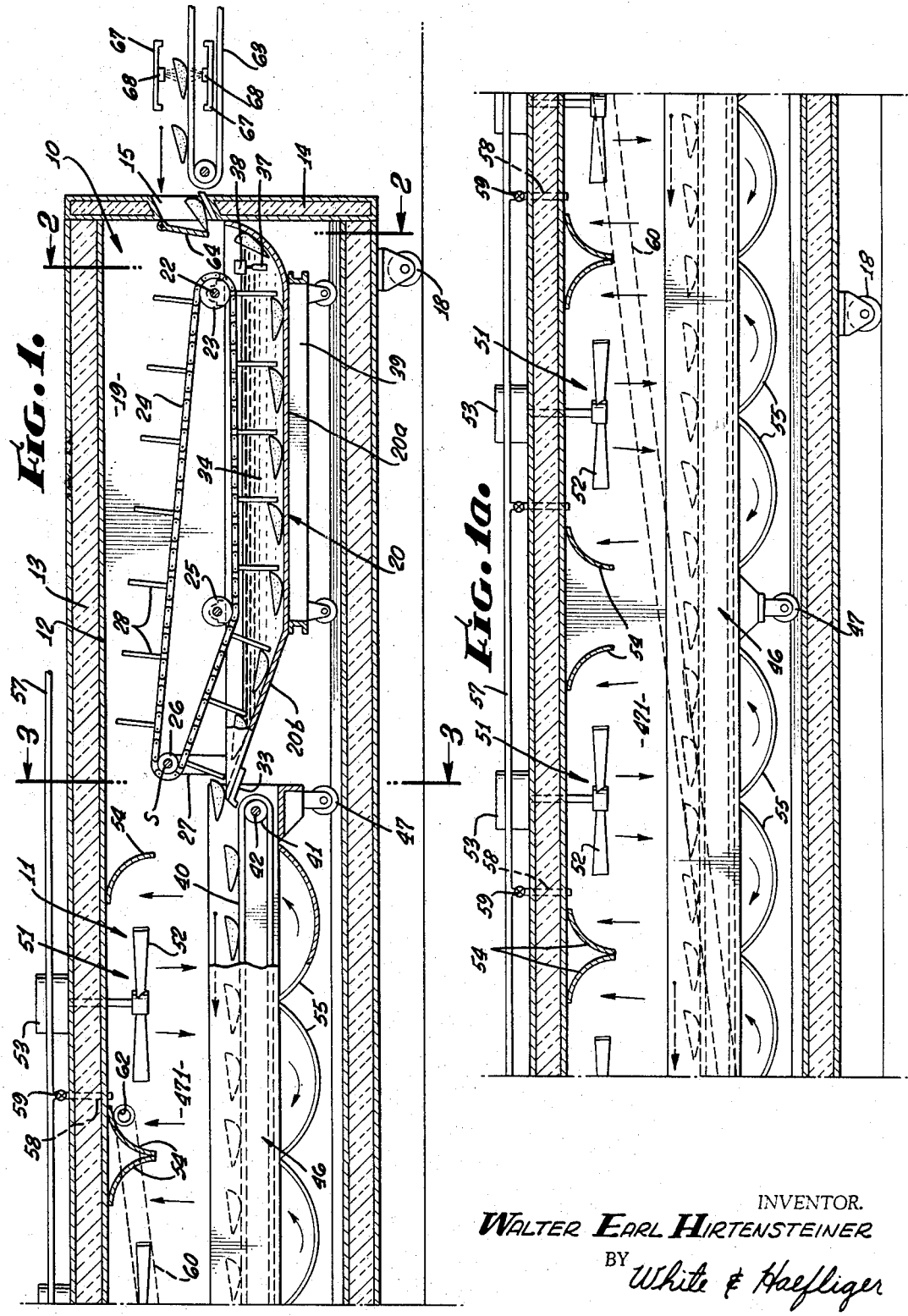
INVENTOR.
WALTER EARL HIRTENSTEINER
BY White & Haefliger
ATTORNEYS.

Oct. 8, 1968  W. E. HIRTENSTEINER  3,404,989
METHOD OF FREEZING FOODS WITH LIQUID NITROGEN
Filed March 9, 1964  2 Sheets-Sheet 2
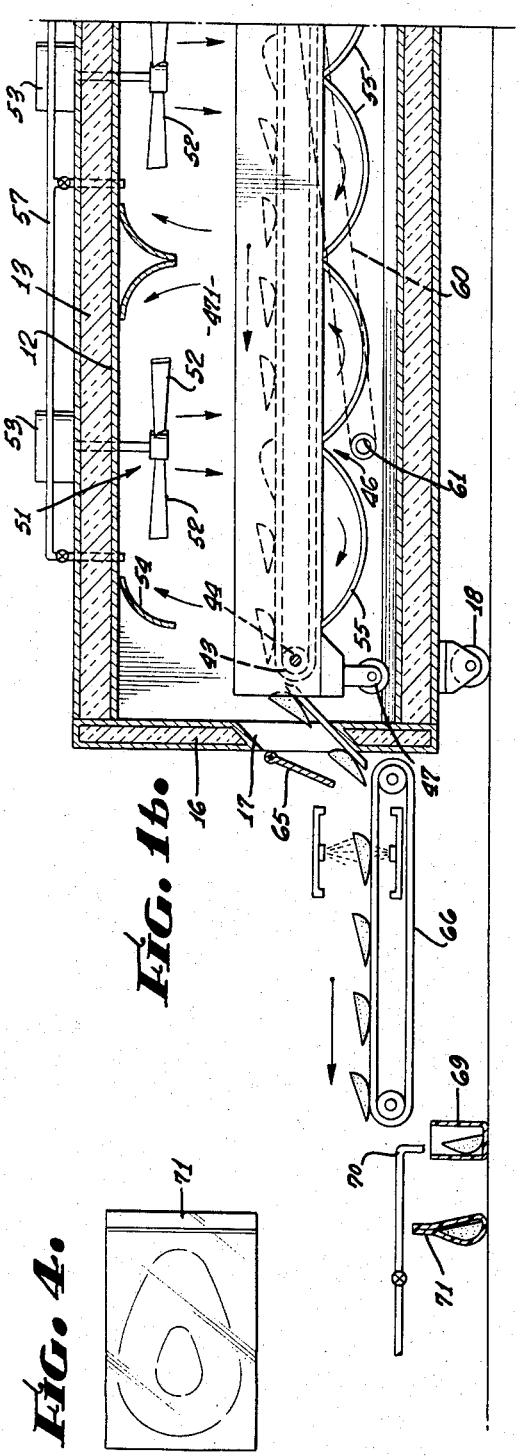
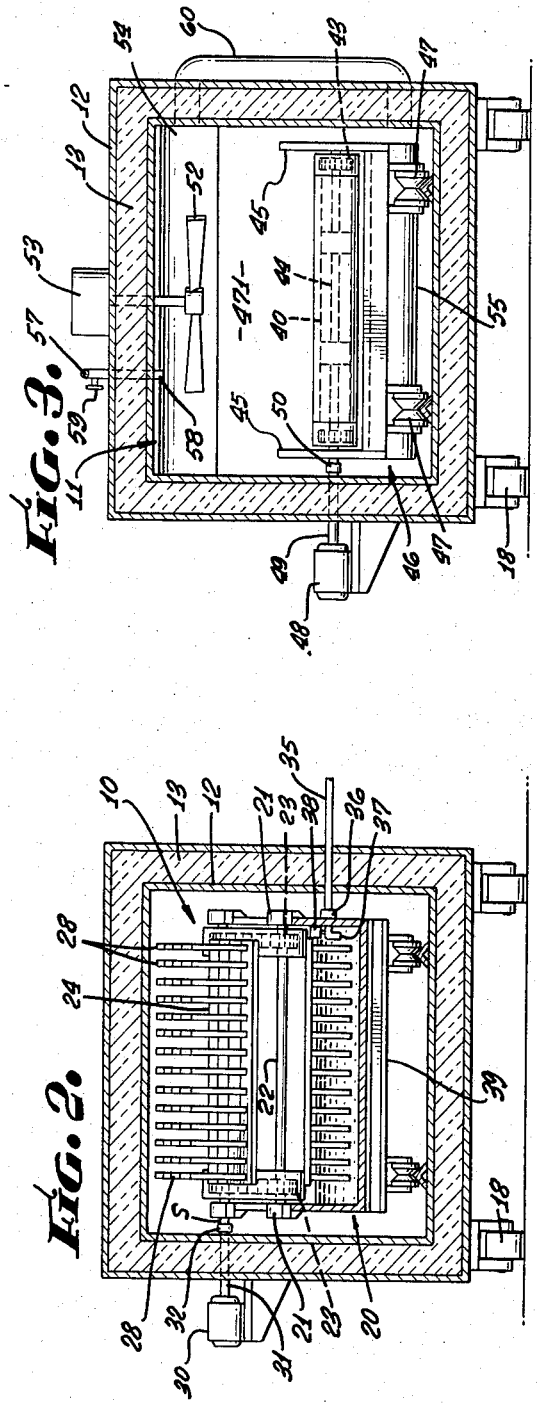
INVENTOR.
WALTER EARL HIRTENSTEINER
BY White & Haefliger
ATTORNEYS.

3,404,989
METHOD OF FREEZING FOODS WITH LIQUID NITROGEN
Walter Earl Hirtensteiner, 15051 Eastvale Road,
Poway, Calif. 92064
Filed Mar. 9, 1964, Ser. No. 350,248
20 Claims. (Cl. 99—193)

ABSTRACT OF THE DISCLOSURE

Preservation of foods by freezing that includes contacting the food with liquid nitrogen and then advancing the food along an extended path where it is contacted with nitrogen gas being evolved from liquid nitrogen at a temperature of about −320° F. The nitrogen gas contact is at high velocity at successive locations along the path absorbing heat from the food so that the temperature of the exiting gas has increased by 200° F.

*Preliminary discussion and description of the invention*

This invention has to do with the preservation of foods by freezing, and is directed particularly to such methods employing low temperature nitrogen by procedures that may be used to freeze food products throughout to temperatures at least as low as 0° F., and lower if desired.

Preliminarily it may be observed that the invention is applicable to preservation by freezing of food products in general that permit economically the use of liquid nitrogen, particularly where cooling throughout the food is to be carried to sub-freezing. Thus, the invention has applicability to the freezing of fruits and vegetables in general, as well as to cooked foods, which may benefit from preservation resulting from freezing throughout to temperatures below those commonly employed. As will later appear, certain aspects of the invention are applicable to food processing by cooling within higher temperature ranges, but otherwise and primarily, the invention has resulted from the pursuit of objectives having to do with cooling processes employing liquid nitrogen in a manner such that the food under treatment becomes cooled throughout to temperatures below 0° F., with particular or additional provisions made for obviating what otherwise might be deleterious effects of extreme low temperature cooling, as well as for maintaining the resulting products indefinitely in preserved condition.

In one of its major aspects, the invention contemplates freezing procedures as outlined, according to which the food in an initial stage is directly contacted with liquid nitrogen in a manner such that heat removal from the food occurs by efficient liquid-to-solid contact, and otherwise under conditions such that preferably the bulk, i.e. in excess of 50%, of the sensible heat in the food and within the temperature range between ambient and the temperature to which the food finally is cooled, is removed in the initial stage. The resulting heat exchange causes vaporization of liquid nitrogen and the production of gas ranging in temperature from about −320° F. upon vaporization, to a higher temperature determined by conditions selected for practice of the process. Typically advantage may be taken of the cooling capacity of the gas through a temperature range up to about 0° F. to −320° F.

Following the liquid nitrogen cooling, the food is subjected to further cooling in a second stage wherein the food is contacted with low temperature gas evolved from the liquid, under conditions particularly conceived toward more advantageous utilization of the cooling capacity of the gas by providing for highly efficient gas-to-solid heat transfer, so that such transference results in cooling of the food throughout to the low temperatures indicated, utilizing only gases given off by the first stage liquid nitrogen. This generally applicable concept, however, does not preclude introduction of supplemental low temperature nitrogen to the second cooling stage, as by injection of liquid nitrogen, under certain or special conditions where such added cooling may be desirable.

Further in reference to the second or gas cooling stage, the invention has for its object to accomplish highly efficient heat transfer from the food to gas by advancing the food along an extended path within and through a correspondingly elongated cooling zone wherein the gas is maintained in high velocity contact with the surface of the food. As will appear, accomplishment of this objective takes into account a further goal in maintaining the gas circulation in a manner calculated to take maximum advantage of greatest maintainable temperature differentials between the gas and the food at progressive locations through the cooling zone. Briefly, these objectives are accomplished by evolving gas from the first stage into the cooling zone and therein positively circulating the gas at different or progressive locations along the path of the food advancement, in courses generally transversely of such path and at high velocities, as in the range of about 1500 to 3000 feet per minute, which assure the desired high rates of heat transfer. Specifically, such circulation may result from the operation of successive fans or blowers whose displacements are so baffled or directed as to cause circulation of the gas through the path of the food advancement, as distinguished from longitudinally thereof, thus to provide for high velocity maintenance of the gas along the cooling course until full advantage is taken of the cooling potential of the gas at the gradient existing between the gas inlet and outlet temperatures, and as permitted by the available conserved quantity of gas flowing through the zone.

The invention has made possible the overall cooling effects required for preservation, in a manner permitting maintenance in that condition indefinitely of quality products heretofore considered to be incapable of preservation, at least without physical impairments such as various forms and degrees of disintegration and loss of normal texture, as well as degradation of color and flavor, which would render the products unacceptable in the market. Failure heretofore to preserve avocados by freezing, is an outstanding example. Such adverse consequences have resulted in prior efforts primarily or importantly from the effect of the cooling techniques to form in the products ice crystals so large as to disrupt the normal texture of the product. In accordance with the present invention, the freezing effects occur under such conditions of temperature, time and accelerated heat transfer rates, as to result in conversion of the moisture content of the product to discrete ice crystals so small and remaining so distributed as to cause no physical or other impairment of the product notwithstanding the low temperatures to which it becomes frozen throughout.

In the case of various food and vegetables, it has been observed that sudden and severe cooling in the initial liquid contact stage may be productive of at least surface cracking or crazing of the product, a condition to be avoided if the product is to be saleable. The invention provides a simple and effective method of preventing such disruptures, by the simple expedient of initially wetting all surfaces of the product before contact with or emersion in the liquid nitrogen, as by filming the produce with water or an aqueous solution, such as a solution of anti-oxidant. Studies indicate that the aqueous film affords such distribution or equalization of cooling and heat transfer effects in the liquid-to-solid exchange as to obviate those conditions, apparently ununiform or sharply unequalized cooling effects, that are productive of cracking.

Other objects of the invention have to do with packaging and ultimate preservation of the frozen foods. After removal from the second cooling stage of various fruits and vegetables that may be subject to discoloration, flavor or texture impairment or other form of degradation as a result of oxidation, such degradation is precluded by application to the frozen pieces of surface coatings or glazes of suitable anti-oxidants, of which various are known throughout their past uses in other types of food processing or preservation.

Finally, the invention provides for packaged maintenance of the products in condition that will assure their preservation under ordinary refrigeration for indefinite periods. For this purpose the frozen produce, most generally that which has been treated to inhibit oxidation, is packaged in sealed containers such as impermeable plastic packets containing individual pieces, or bags containing bulk quantities of the product, which are hermetically sealed after substantial removal or depletion of the air content of the packages. Such depletion may practically be accomplished by purging the containers with nitrogen to displace almost all of the air, following which the produce is sealed into the packages to remain closed from exposure to consequential oxidation.

All the various features and objects of the invention, as well as the details of certain illustrative embodiments, will be understood more fully from the following detailed description throughout which reference is had to the accompanying drawings in which:

FIGS. 1, 1a and 1b are views continuing leftward in that order, showing the freezing equipment in longitudinal section, together with diagrammatically illustrated apertinent equipment at the feed and discharge ends;

FIGS. 2 and 3 are cross sections taken respectively on lines 2—2 and 3—3 of FIG. 1; and FIG. 4 shows a packaged product.

Generally considered, the freezing equipment may be regarded as comprising a first stage, generally indicated at 10, wherein the produce or other food to be frozen is subjected to initial cooling by contact with liquid coolant, and a second freezing stage generally indicated at 11, wherein the product undergoes continuing cooling and freezing by contact with gas evolved from the first stage liquid and which is circulated in high velocity contact with the produce. Both stages may conveniently be accommodated in a single elongated chamber defined by walls 12 encased within a thermal insulating jacket 13 so composed as to minimize atmospheric heat transfer into the cooling zones. During operation, the inlet end of the chamber is closed by a removable insulation closure 14 having a produce inlet opening 15, and the opposite end of the extended chamber has a similar removable closure 16 containing a produce discharge opening 17. It may be desirable to adapt the entire cooling chamber structure to be movable or transportable for use at different locations, for which purposes the structure may be suitably mounted on wheels or casters 18.

Referring particularly to the first freezing stage 10, the corresponding chamber extent 19 is shown to contain an elongated open vessel 20 on the sides (FIG. 2) of which are journaled at 21 a shaft 22 keyed to rolls or sprockets 23 which carry an endless reticulated belt 24 passing over idler rolls or sprockets 25 mounted on the sides of the vessel 20, and rolls or sprockets 26 mounted on the vessel-carried supports 27 and driven by shaft S. The belt 24 carries a succession of transverse rows of fingers which function as pushers to advance the produce through the vessel 20. Preferably, the body of the belt 24 is non-metallic and has plastic or resin segments of nylon, Teflon or the like which obviate expansion and contraction difficulties in a metallic belt or conveyor subjected to the extremely low temperature of the liquid bath. The pusher fingers 28 however may be metallic. Due to the low chamber temperature, shaft S is driven from the outside by motor 30 whose shaft 31 is disconnectably coupled at 32 to the belt drive shaft. As illustrated in FIG. 1, the vessel 20 has at 20a an essentially horizontal extent beyond which the bottom inclines upwardly at 20b to a discharge lip 33 overlying the later described gas cooling chamber conveyor. Any suitable provision may be made for feeding into and maintaining a body 34 of the liquid coolant in vessel 20. Merely as illustrative, the coolant may be introduced through line 35 releasably coupled at 36 to inlet 37 positioned inside the vessel and having associated therewith an appropriate liquid level control diagrammatically indicated at 38. It is desirable that the vessel and conveyor assembly be removable from the chamber 19 for any of such purposes as cleaning, replacement or repair of parts. Accordingly the vessel 20 is shown to be mounted on a wheeled carriage 39 so that upon disconnection of couplings 32 and 36 and removal of the end closure 14, the vessel and conveyor structure may be pulled out of the chamber.

Low temperature gas released from the liquid bath 34 passes forwardly into the atmosphere of the second cooling stage 11 wherein the produce advances on an elongated conveyor 40 where may be of any suitable construction and is shown diagrammatically to be carried on sprockets 41 carried by shaft 42, the opposite end of the conveyor belt passing over sprockets 43 driven by shaft 44. Referring to FIG. 3, the conveyor shafts extend between and are supported by the sides 45 of an appropriate frame structure generally denoted at 46 and which may be mounted on wheels 47 to permit removal of the conveyor and later described frame mounted baffles from the second stage chamber 47 after removal of the end closure 16. Shaft 44 is driven from the outside by motor 48 whose shaft 49 is releasably coupled at 50 to the conveyor drive.

Provision is made at successive locations generally indicated at 51 within chamber 471, and of which there may be any suitable number, for circulating the first stage gas effluent in repeated high velocity contact with the produce on the conveyor 10 at the individual stages 51, while maintaining a relatively low net flow of the gas through the chamber. Each of the stages 51 employs a fan or blower of suitable design and conventionally illustrated at 52 driven by motor 53 mounted on top of the chamber structure. The fan displaces the cold gas downwardly against and through the produce on the conveyor. Baffles 54, concave in relation to the fan, extend transversely across the rectangular chamber 471 and serve to direct to the fan the gas return flow in the direction of the arrows in FIG. 1a. Directly beneath the fan and baffles 54, the conveyor frame structure 46 mounts a pair of downwardly concave transversely extending baffles 55 which, in accordance with the arrows, direct the fan displacement that has passed through the produce, outwardly and upwardly and again through the produce so that the bulk of the chamber gas at any one of the locations 51 undergoes repeated recirculation through and in contact with the produce being frozen. To achieve the objectives of high transfer rates of heat from the produce to the gas, the fans 52 are so designed and given operating speeds to maintain the produce contacting velocity of the gas at high rates as in the range of about 1500 to 3000 feet per minute. Thus, at each stage 51 there is maximized the cooling potential of the gas by its high velocity retention, and the stage succession is caused to operate at progressively reducing temperature gradient running through the chamber to as practicably high a temperature as may be desired at the outlet 17, say in the order of 0° F. to −100° F., governed by the net gas flow through the chamber. Such flow is controllable in any suitable manner as by the area relation of the inlet 15 to the outlet 17, where the latter is larger and therefore the total gas flow is to the outlet.

Whereas ordinarily, the cooling capacity of the gas evolved from the first stage liquid will suffice to reduce the temperature in chamber 471 of the produce throughout well below 0° F., provision may be made to implement the second stage cooling capacity as by flashing extraneous liquid coolant at one or more locations in the second chamber atmosphere. Thus, diagrammatically, liquid normally gaseous coolant supplied through line 57 may be released through outlets 58 under control of valves 59 at one or more locations within chamber 471. Also, it may be desirable to provide for recirculation of gas within the chamber, for which purpose I may provide at one or both sides thereof ducts 60 leading from locations at 61 near the outlet end of the chamber to return inlets at 62 toward or near the inlet end of the chamber and in such relation to one of the fans 52 that gas displacement by the latter will induce the return flow through duct 60.

Specific residence times during which a food or produce will remain in the initial and second freezing stages, i.e. chambers 19 and 471, may be varied in accordance with the character and requirements of a particular food or produce, of which fruits, vegetables and melons in general, and prepared foods, are illustrative. The particular applicability of the invention to the freezing and preservation of avocados is dealt with in my copending application Ser. No. 350,247, now Patent No. 3,361,578, filed on even date herewith and entitled "Preservation of Avocados by Freezing." While it is understood that the previously described apparatus is regarded as illustrative only as equipment for carrying out the invention, the particular apparatus disclosed is the subject of my copending application Ser. No. 560,358, now U.S. Pat. No. 3,376,710 (a continuation of application Ser. No. 350,249) now abandoned, also filed on even date herewith and entitled "Food Freezing Apparatus." fi The food or produce to be frozen may be fed on conveyor 63 through inlet 15 which may or may not have a pivoted closure 64 displaceable by the produce. The latter drops into the liquid coolant bath 34 and is advanced therein by the pushers 28 at a rate governed by the length of time required or desired for that initial extent of cooling by direct contact with the liquid coolant at high solid-to-liquid heat transfer rates. Upon advancement out of the bath, the produce is carried forward on conveyor 40 again at a controlled rate governed by the ultimately desired temperature to which the produce is to be frozen throughout, in relation to the effective gas cooling potential governed in general by the maintained produce-to-gas heat transfer rates, the net gas flow through the chamber and the controlled gas outlet temperature, which typically may be about 0° F. to −50° F. From conveyor 40 the produce is discharged through outlet 17 which may or may not have a displaceable closure 65, onto conveyor 66 for any desired further treatment to be given to frozen produce.

The following may be cited as typical examples of produce suitable for preservation in accordance with the invention, and illustrative residence times in the cooling stages. Berries, such as strawberries, have been satisfactorily treated with bath emersion time of around 25 seconds followed by about four minutes time for passage through the chamber 471 wherein the fans 52 operated at a gas displacement velocity of around 2000 feet per minute. Pineapple sections were given 50 seconds residence time in the bath and 8 to 9 minutes gas contact in the second stage. Papayas required around 40 second bath emersion time followed by about 7 minutes in the chamber beyond. Mushrooms were properly treated given about 15 seconds in the bath with about three minutes exposure to the gas circulation. In any instance, the residence times will depend upon the size and kind of produce being frozen. In general, it will be found that a greater amount (in excess of 50%) of removal from the produce of its sensible heat above final freezing temperature will occur in the first of bath cooling stage.

Because of the extremely low temperature (−320° F.) of the liquid bath 34, some fruit, vegetable or melon produce may be subject to surface cracking or crazing during or as a consequence of residence in the bath. While not fully known, it appears that a principal reason for cracking or crazing may be non-uniformity of heat transference over the surface area of the produce to the liquid coolant. In accordance with the invention, I have discovered a simple and effective way to obviate such impairment of the produce by subjecting the latter preliminarily, as while upon the conveyor 63, to an aqueous surface coating or filming, which may be accomplished by dipping, spraying or wetting in any other suitable manner which results in complete surface filming. As illustrative, I have shown diagrammatically a chamber structure 67 within which liquid is sprayed downwardly and upwardly against the produce from nozzles 68. The filming liquid may be water or any of various aqueous solutions as of the later mentioned anti-oxidants. Upon entering the bath 34, the effect of the aqueous surface coating is to present a heat transfer rate equalizing medium or film, which apparently reduces the differential of heat transfer rates that would otherwise occur within different areas of the produce surface (and which apparently are the cause of cracking or crazing) to a degree such that upon leaving the bath and thereafter, the produce surfaces remain free from any consequential or objectionable disruptures.

It may be desirable to further treat the frozen produce shown to be discharged through outlet 17 onto a conveyor 66, for the purpose of preventing or inhibiting oxidation with resultant impairment of color or other qualities. For this purpose, the produce may be given a film or glaze coating of any of various anti-oxidants heretofore applied in other or conventional processes to various kinds of fruit or vegetable produce. Typical anti-oxidants are aqueous solutions of ascorbic (vitamin C) sodium sulfite, citric acid, and also sulphur dioxide. I have found to be particularly effective as an anti-oxidant full strength or somewhat diluted lemon juice, which has been observed to maintain, especially, cut or section fruit against oxidation degradation.

The invention lends itself to particular advantage in the production of froezn foods for packaging and in hermetically sealed packages within which the produce will remain preserved indefinitely under ordinary store or domestic refrigeration temperatures. As illustrative of a particularly contemplated packaging, one or more pieces of the frozen produce, with or without anti-oxidant coating, may be placed within packages indicated at 69 to be in the form of transparent air-impermeable bags or packets made typically of polyethylene, from which air is displaced by an inert gas such as nitrogen jetted through nozzle 70 into the packet. Thereupon the latter is hermetically sealed at 71. The combined effects of freezing of the product throughout, application of the anti-oxidant if used, and exclusion of consequential oxidizing air from the packed, results in a visibly preserved and naturally appearing packaged product (FIG. 4) suitable for general distribution and sale.

In further reference to the first cooling stage involving solid-to-liquid heat transfer, the present process provides for greater cooling efficiency and uniformity by reason of the fact that the produce is maintained in advancing motion through the liquid nitrogen, as distinguished from merely reposing therein. Relative motion between the produce and coolant is productive of higher heat transfer rates at the produce surfaces, and also of greater uniformity in heat transfer by reason of the effect of the liquid turbulence or motion in dissipating gas bubbles that might otherwise adhere to and locally lessen the rate of heat flow from the produce surfaces to the coolant.

I claim:

1. Method for the preservation of a food by freezing that includes maintaining the food in contact with liquid nitrogen in a first cooling stage, then further cooling the food in a second cooling stage by advancing the food through an extended path within and through an elongated zone leading from said stage and occupied by nitrogen gas vaporized by said liquid nitrogen contact with the food, and circulating the gas at high velocity in repeated contact with the food passing through said zone so that heat is withdrawn from inside the food at a rate accelerated by the velocity of the gas contacting the food.

2. Method of claim 1, in which the food in said first stage is passed through a bath of liquid nitrogen in open communication with said zone.

3. Method of claim 1, in which the gas is circulated in said zone generally transversely of the path of advancement of the food.

4. Method of claim 1, in which the gas is given positive displacements at successive locations along said path and in circulating courses of flow generally transversely of said path.

5. Method of claim 4, in which a flow of gas is maintained through said zone in the direction of the food advancement and leaves the zone at a temperature between 0° F. and −100° F.

6. Method of claim 5, in which gas is recirculated from a location toward the gas exit end of said zone to a lower temperature location toward the inlet end thereof.

7. Method of claim 1, in which the food leaving said zone is cooled throughout to a temperature below 0° F. and in which the gas is discharged from the zone at a temperature below 0° F. and above −100° F.

8. Method of claim 7, in which a greater portion of the total sensible heat removed from the food is removed in said first cooling stage.

9. Method of claim 1 in which the food is maintained in contact with liquid nitrogen in said first cooling stage for a period under one minute and then is maintained in contact with said circulating gas for a period between about 3 and 8 minutes.

10. The method of claim 1 as applied to food products subject to surface cracking by reason of the first stage cooling, and in which an aqueous surface coating is applied to the food prior to its contact with the liquid nitrogen in the first stage to prevent said cracking.

11. The method of claim 1, in which the food after cooling in said second stage is given a coating which thereafter inhibits oxidation of the food.

12. The method of claim 2, as applied to fruits and vegetables subject to surface cracking by reason of the first stage cooling in which an aqueous coating is applied to the food prior to its contact with the liquid nitrogen in the first stage to prevent said cracking, and in which the food after said second stage cooling is given a coating which thereafter inhibits oxidation of the food.

13. The method of claim 1, in which the food after cooling in the second stage is sealed in packages from which air has been displaced.

14. The method of claim 11, in which the food after cooling in the second stage is sealed in packages from which air has been displaced.

15. The method of claim 12, in which the food after cooling in the second stage is sealed in packages from which air has been displaced.

16. Method for the preservation of a food by freezing, that includes advancing the food in an extended path within an elongated zone, releasing into said zone nitrogen gas being evolved from liquid nitrogen at a temperature of about −320° F., positively displacing the gas at successive locations along said path to circulate the gas generally transversely of said path against the food and at said locations while passing the gas through the zone in the direction of the food advancement, and absorbing heat from the food into the gas so that the temperature of the gas leaving said zone is below 0° F. and above −100° F.

17. The method of claim 16, in which liquid nitrogen is introduced to said zone.

18. Method for the preservation of a food by freezing, that includes continuously advancing the food in an extended path through and out of an elongated zone, feeding into said zone nitrogen gas being evolved from liquid nitrogen at a temperature of about −320° F., positively displacing the gas at each of successive locations along said path to recirculate the gas generally transversely of said path and against the food at each of said locations, maintaining a constant flow of the gas through the zone, releasing the gas therefrom at a rate in correspondence with the rate of nitrogen introduction thereto, and absorbing heat from the food into the gas so that the temperature of the gas released from said zone is below 0° F. and above −100° F.

19. The method of claim 18, in which liquid nitrogen is introduced to said zone.

20. The method of claim 18, in which the gas flows through the zone in the direction of the food advancement.

References Cited

UNITED STATES PATENTS

| | | | |
|---|---|---|---|
| 2,385,140 | 9/1945 | Knowles | 62—173 |
| 3,039,276 | 6/1962 | Morrison | 99—193 |
| 3,250,630 | 5/1966 | Webster et al. | 99—193 |
| 3,294,553 | 12/1966 | Benson | 99—193 |
| 3,297,454 | 1/1967 | Webster et al. | 99—193 |

OTHER REFERENCES

Tressler et al.: The Freezing Preservation of Food, AVI Pub. Co., 1957, pp. 119–128.

A. LOUIS MONACELL, *Primary Examiner.*

S. B. DAVIS, *Assistant Examiner.*